Aug. 6, 1963     R. G. D'ASCOLI ET AL     3,100,136
METHOD OF MAKING POLYETHYLENE-INSULATED POWER CABLES
Filed June 18, 1959
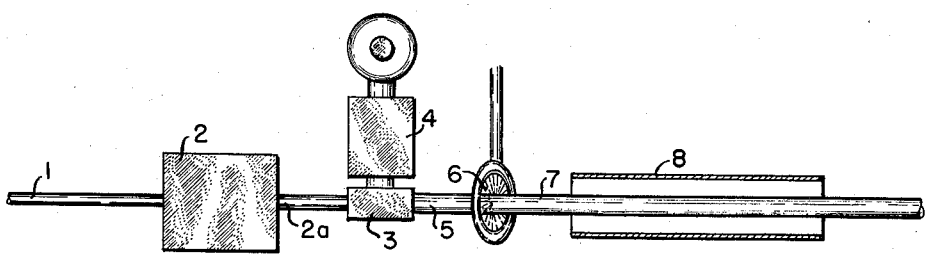
INVENTOR.
RALPH GREGORY D'ASCOLI
LAWRENCE CHARLES EBEL
BY
ATTORNEYS

United States Patent Office 3,100,136
Patented Aug. 6, 1963

3,100,136
METHOD OF MAKING POLYETHYLENE-INSULATED POWER CABLES
Ralph Gregory D'Ascoli, Yonkers, and Lawrence Charles Ebel, Hastings on Hudson, N.Y., assignors to Anaconda Wire and Cable Company, a corporation of Delaware
Filed June 18, 1959, Ser. No. 821,074
6 Claims. (Cl. 18—59)

This invention relates to a method for making shielded electric conductors which are insulated with polyethylene and, more particularly, to a method for intimately bonding an electrostatic shield to either the inner or the outer face of a layer of polyethylene insulation surrounding an electric conductor, to protect the insulation against the formation or development of any focal points at which corona discharge might occur. This application is a continuation-in-part of our copending application Serial No. 565,609, filed February 15, 1956, on which United States Letters Patent No. 2,913,515 was granted November 17, 1959.

Polyethylene is a rigid, waxy, translucent, synthetic resin having excellent dielectric properties, ozone resistance, moisture resistance, and chemical stability. It has been extensively used in recent years for insulating high frequency conductors which normally carry only small currents. Although it possesses excellent chemical, physical, and electrical properties as an insulating material for high voltage power cables which carry relatively large currents, its use for this purpose has been limited due to the tendency of polyethylene to separate slightly from the conductor or conductive shield and to form small air gaps which become focal points for ionization and corona discharge, the ultimate result of which is electrical breakdown of the cable.

Using a semiconductive shielding composition consisting essentially of methylated paraffin combined with a modifier of its inherent brittleness and tackiness and containing a sufficient amount of carbon black or equivalent material to render it electrically conductive, we have found that by bringing the semiconductive shielding composition in contact with molten polyethylene which is in an amorphous state, using sufficient pressure to force the molten polyethylene into intimate contact with the shielding composition, it is possible to form an intimate bond between the shielding composition and the polyethylene. Intimate bonds may also be formed between the shielding composition and polypropylene insulation when molten polypropylene is used in place of the polyethylene. These bonds are so resistant to rupture that no voids or fissures or air gaps are formed at the bond interface even when the polyethylene is subject to stresses and strains comparable to those which occur in cable insulation.

Based on these discoveries, the invention provides an improved method for forming an intimate bond between an electrostatic shield and polyethylene or polypropylene insulation surrounding an electrical conductor to protect the insulation against the development of any focal points at which corona discharge might occur. In essence, the method of the invention comprises coating a metallic conductor with a continuous semiconductive film consisting essentially of from 25 to 50 percent by weight of methylated paraffin, from 20 to 60 percent by weight of either polyvinyl acetate or chlorinated paraffins (both of which modify the inherent brittleness and tackiness of methylated paraffin without impairing its adhesion to polyethylene or to polypropylene), and from about 10 to 50 percent by weight of carbon-black particles uniformly dispersed throughout the film coating to render it electrically conductive, and then extruding a molten polyalkylene of the group consisting of molten polyethylene and polypropylene in an amorphous state about the coated conductor at a temperature of at least 250° F. and at a pressure from 200 to 1200 pounds per square inch so that molten polyalkylene is forced under pressure into all of the surface irregularities in the semiconductive film, thereby forming an intimate bond between the semiconductive film surrounding the conductor and the inner face of the polyalkylene insulation. If desired, an additional shielding layer of semiconductive film coating may be intimately bonded to the outer face of the insulation merely by applying the same or an equivalent shielding composition to the insulation as it leaves the extruder but while it is still in an amorphous and near-molten state, thereby firmly bonding the shield to the insulation.

The particular semiconductive shielding compositions which may be intimately bonded to polyethylene or to polypropylene insulation in accordance with the invention include those described in our copending application Serial No. 565,609, filed February 15, 1956. These shielding compositions have excellent adherence to both polyethylene and polypropylene. Basically, the shielding composition contains methylated paraffin combined with either a polyvinyl acetate or chlorinated paraffins, both of which modify the inherent brittleness and tackiness of methylated paraffin without impairing its adhesive properties. The composition also contains a sufficient amount of conducting or semiconducting particles, such as carbon black, to render it electrically conductive. In general, the semiconductive shielding compositions contain from 25 to 50 percent by weight of methylated paraffin, from 20 to 60 percent by weight of modifier (e.g., polyvinyl acetate or chlorinated paraffins), and from about 10 to about 50 percent by weight of carbon-black particles.

The unique properties of this composition are largely attributable to the combination of methylated paraffin with the other components. Methylated paraffin is the polymerization product obtained by catalytic reaction of a mixture of monomers having an average molecular weight of about 90 and composed of dienes and reactive olefins. The polymerization product, which is a methylated paraffinic hydrocarbon chain, is a hard, brittle, thermoplastic resin having an average molecular weight between 1000 and 1400 and a softening point of about 100° C. as measured by the ball and ring method. The methylated paraffin manufactured by the Pennsylvania Industrial Chemical Corporation under the trade name "Piccopale" is a typical example of a methylated paraffin and has been found to give very satisfactory results.

A large proportion of carbon black in the shielding composition produces a semiconductive composition of relatively high conductivity. Although decreasing the amount of carbon block results in an increase in the film strength of the composition, the amount of carbon black cannot be reduced to less than about 10 percent by weight, below which concentration the carbon black particles become so dispersed that they lose contact with one another, thus reducing the conductivity of the composition to an excessively low level.

The shielding composition used to coat the metallic conductor is conveniently prepared by heating a mixture of the methylated paraffin and chlorinated paraffins until the mixture becomes fluid, at which point the carbon black is added and thoroughly dispersed throughout the mixture. Upon cooling, the composition solidifies to a soft solid, which, when brought into contact with a heated conductor, melts to form a smooth, continuous coating around the conductor.

To intimately bond the semiconductive shielding composition to the inside surface of a layer of polyethylene insulation about a conductor in accordance with the invention, the metallic conductor is coated with a continuous film of the shielding composition by heating the conductor and passing it through the shielding composition just before it enters the extruder by which the polyethylene insulation is applied. Upon entering the extrusion head, the semiconductive film coating surrounding the conductor comes in contact with the molten polyethylene as it is extruded around the conductor. By maintaining the temperature of the polyethylene in the extrusion head at not less than about 250° F., which temperature is above the normal melting point of the polyethylene, and by employing extrusion pressures from 200 to 1200 pounds per square inch, it is possible to force molten polyethylene into all of the surface irregularities in the semiconductive film coating and to intimately bond the film to the inner face of the extruded layer of polyethylene insulation. This bond is so strong that even though the conductor may loosen within the semiconductive film coating, the film coating remains in contact with the inner face of the polyethylene insulation and thereby protects the insulation against the formation and development of any voids at which ionization and corona discharge might occur.

Where polyethylene insulation is used, then as a general rule, we prefer to extrude the polyethylene insulation about the coated conductor at temperatures in excess of 300° F. at extrusion pressures from 600 to 1200 pounds per square inch to insure that the molten polyethylene will be forced into all of the surface irregularities in the semiconductive film, and to obtain an exceedingly firm bond of the polyethylene to the semiconductive coating.

A shielding layer of the semiconductive film coating may also be applied to the outer face of the polyethylene insulation as it leaves the extrusion head while the insulation is still in a near-molten and amorphous state, no pressure being required to bond this shielding layer to the outer surface of the insulation provided the polyethylene is still in an amorphous state. In such case, the shielding composition or a solution of it in a volatile solvent may be applied to the outer surface of the insulation by spraying or pouring it over the outer surface of the insulation.

The coating composition for the outside of the insulation is conveniently prepared by dissolving the methylated paraffin and polyvinyl acetate in a mutual solvent, such as ethylene dichloride, butyl acetate, or methyl isobutyl ketone, the solvent reducing the viscosity sufficiently so that the shielding composition may be applied by dipping, brushing, or even spraying. The amount of the solvent is varied to suit the method of application, evaporating from the coating soon after application to the outer surface of the amorphous insulation. After dissolving the methylated paraffin and polyvinyl acetate in the solvent, the carbon black is then added to the solution, using an additional amount of solvent to impart the desired viscosity to the composition.

The drawing is a schematic representation of a preferred embodiment of the process of this invention.

In the process illustrated by the drawing a heated electrical conductor 1 passes through a container 2 of shielding composition comprising methylated paraffin, chlorinated paraffin, and a sufficient quantity of carbon black to render the composition semiconducting. A coating 2a of the shielding composition adheres to the emerging conductor, which then passes through the extrusion head 3 of an extruder 4 where it is covered with hot polyethylene. The polyethylene leaves the extrusion head as a concentric wall of amorphous insulation 5 around the conductor 1 and its shielding 2a. Before the polyethylene 5 has cooled from its amorphous state it is sprayed with a semiconducting solution 6 comprising methylated paraffin and polyvinyl acetate dissolved in a solvent such as ethylene dichloride, and having semiconducting particles of carbon black suspended therein. The solvent evaporates from the solution 6 under the influence of the sensible heat of the polyethylene insulation 5, leaving a semiconducting coating 7 on the insulation. The insulated and coated conductor then passes through a cooling trough 8.

Table I lists the formulations of two semiconductive shielding compositions which were used in examples of the invention described below. One of these compositions (Composition A) was used to form an electrostatic shield about the inner face of a layer of polyethylene insulation surrounding an electrical conductor, while a solution of the other (Composition B) was employed to form an electrostatic shield around the outer face of the insulation.

TABLE I

*Semiconductive Shielding Compositions*

[Parts by weight]

| | A | B |
|---|---|---|
| Methylated paraffin | 40 | 20 |
| Polyvinyl acetate | | 40 |
| Chlorinated paraffins (40-42% chlorine) | 20 | |
| Chlorinated paraffins (68-73% chlorine) | 20 | |
| Wax | 20 | |
| Acetylene black | 10 | 50 |

A heated conductor was coated with a conductive film of the shielding composition (Composition A) and then passed into and through an extrusion head where molten polyethylene was extruded around the coated conductor at a temperature in excess of 300° F. and at a pressure of about 1000 pounds per square inch. Upon leaving the extrusion head, the outer surface of the insulation, which was still in a near-molten and substantially amorphous state, was coated with an additional layer of semiconductive shielding composition (Composition B) by spraying an ethylene dichloride solution of this composition about the outer surface of the polyethylene prior to its entry into a cooling trough.

The shielded, insulated conductor thus made was tested successfully, without ionization, at 18 kv. Even upon stretching the conductor to loosen within the insulation, the cable operated without ionization at voltages up to 7.8 kv. By way of contrast, a polyethylene-insulated conductor which was identical in all respects except that it did not contain electrostatic shields bonded to the inner or outer faces of the insulation showed ionization even at voltages below 1.0 kv. after the conductor had been stretched and loosened from the insulation.

Although the foregoing example has illustrated the effectiveness with which polyethylene insulation may be intimately bonded to a shielding composition in accordance with the invention, excellent results have also been obtained by using molten or amorphous polypropylene as the insulation in place of the polyethylene.

We claim:

1. A method for forming an intimate bond between an electrostatic shield and polyethylene insulation surrounding an electrical conductor to protect the insulation against the development of focal points at which corona discharge might occur which comprises coating a metallic conductor with a continuous semiconductive film consisting essentially of from 25 to 50 percent by weight of methylated paraffin, from 20 to 60 percent by weight of a polymer selected from the group consisting of polyvinyl acetate and chlorinated paraffins, and from about 10 to 50 percent by weight of carbon-black particles uniformly dispersed throughout the film coating to impart thereto semiconductive properties, extruding molten polyethylene in an amorphous state about the coated conductor at a temperature of at least 250° F. and at a pressure of 200 to 1200 pounds per square inch to force molten polyethylene into all of the surface irregularities in the semiconductive film, thereby intimately bonding said film to the inner face of the polyethylene, and applying an outer layer of the semiconductive film coating to the outer face of the polyethylene while it is still in an amorphous, near-molten state to intimately bond the outer layer of the semiconductive film to the outer face of the polyethylene.

2. A method for forming an intimate bond between an electrostatic shield and polyethylene insulation surrounding an electrical conductor to protect the insulation against the development of focal points at which corona discharge might occur which comprises extruding molten polyethylene in an amorphous state about the conductor, and applying to the outer face of the polyethylene while it is still in an amorphous, near-molten state a continuous semiconductive film consisting essentially of from 25 to 50 percent by weight of methylated paraffin, from 20 to 60 percent by weight of a polymer selected from the group consisting of polyvinyl acetate and chlorinated paraffins, and from about 10 to 50 percent by weight of carbon-black particles uniformly dispersed throughout the film coating to impart thereto semiconductive properties, whereby said outer layer of semiconductive film is intimately bonded to the outer face of the polyethylene.

3. A method for forming an intimate bond between an electrostatic shield and polyethylene insulation surrounding an electrical conductor to protect the insulation against the development of focal points at which corona discharge might occur which comprises coating a metallic conductor with a continuous semiconductive film consisting essentially of from 25 to 50 percent by weight of methylated paraffin, from 20 to 60 percent by weight of chlorinated paraffins, and from 10 to 50 percent by weight of carbon-black particles uniformly dispersed throughout the film coating to impart thereto semiconductive properties, extruding molten polyethylene in an amorphous state about the coated conductor at a temperature of at least 250° F. and at a pressure from 200 to 1200 pounds per square inch to force molten polyethylene into all of the surface irregularities in the semiconductive film, thereby intimately bonding said film to the inner face of the polyethylene, and applying to the outer face of the polyethylene while it is still in a near-molten, amorphous state an outer layer of a semiconductive shielding composition consisting essentially of from 25 to 50 percent by weight of methylated paraffin, from 20 to 60 percent by weight of polyvinyl acetate, and from 10 to 50 percent by weight of carbon-black particles uniformly dispersed throughout the composition to render it electrically conductive, thereby intimately bonding the outermost shielding composition to the outer face of the polyethylene.

4. A method for forming an intimate bond between an electrostatic shield and polyethylene insulation surrounding an electrical conductor to protect the insulation against the development of focal points at which corona discharge might occur which comprises coating a metallic conductor with a continuous semiconductive film consisting essentially of from 25 to 50 percent by weight of methylated paraffin, from 20 to 60 percent by weight of chlorinated paraffins, and from 10 to 50 percent by weight of carbon-black particles uniformly dispersed throughout the film coating to impart thereto semiconductive properties, extruding molten polyethylene in an amorphous state about the coated conductor at a temperature of at least 300° F. and at a pressure from 600 to 1200 pounds per square inch to force molten polyethylene into all of the surface irregularities in the semiconductive film, thereby intimately bonding said film to the inner face of the polyethylene, and applying to the outer face of the polyethylene while it is still in a near-molten, amorphous state an outer layer of a semiconductive shielding composition consisting essentially of from 25 to 50 percent by weight of methylated paraffin, from 20 to 60 percent by weight of polyvinyl acetate, and from 10 to 50 percent by weight of carbon-black particles uniformly dispersed throughout the composition to render it electrically conductive, thereby intimately bonding the outermost shielding composition to the outer face of the polyethylene.

5. A method for forming an intimate bond between an electrostatic shield and polyethylene insulation surrounding an electrical conductor to protect the insulation against the development of focal points at which corona discharge might occur which comprises coating a metallic conductor with a continuous semiconductive film consisting essentially of 40 parts by weight of methylated paraffin, about 40 parts by weight of chlorniated paraffins, about 20 parts by weight of wax, and from 10 to 20 parts by weight of carbon-black particles uniformly dispersed throughout the film coating to impart thereto semiconductive properties, extruding molten polyethylene in an amorphous state about the coated conductor at a temperature of at least 250° F. and at a pressure from 200 to 1200 pounds per square inch to force molten polyethylene into all of the surface irregularities of the semiconductive film, thereby intimately bonding said film to the inner face of the polyethylene, and applying to the outer face of the polyethylene while it is still in a near-molten, amorphous state an outer layer of a semiconductive shielding composition consisting essentially of about 20 parts by weight of methylated paraffin, about 40 parts by weight of polyvinyl acetate, and from 10 to 50 parts by weight of carbon-black particles uniformly dispersed throughout the composition to render it electrically conductive, thereby intimately bonding the outermost shielding composition to the outer face of the polyethylene.

6. A method for forming an intimate bond between an electrostatic shield and polyethylene insulation surrounding an electrical conductor to protect the insulation against the development of focal points at which corona discharge might occur which comprises coating a metallic conductor with a continuous semiconductive film consisting essentially of 40 parts by weight of methylated paraffin, about 40 parts by weight of chlorinated paraffins, about 20 parts by weight of wax, and from 10 to 20 parts by weight of carbon-black particles uniformly dispersed throughout the film coating to impart thereto semiconductive properties, extruding molten polyethylene in an amorphous state about the coated conductor at a temperature of at least 300° F. and at a pressure from 600 to 1200 pounds per square inch to force molten polyethylene into all of the surface irregularities of the semiconductive film, thereby intimately bonding said film to the inner face of the polyethylene, and applying to the outer face of the polyethylene while it is still in a near-molten, amorphous state an outer layer of a semiconductive shielding composition consisting essentially of about 20 parts by weight of methylated paraffin, about 40 parts by weight of polyvinyl acetate, and from 10 to 50 parts by weight of carbon-black particles uniformly dispersed throughout the composition to render it electrically conductive, thereby intimately bonding the outermost shielding composition to the outer face of the polyethylene.

References Cited in the file of this patent

UNITED STATES PATENTS

| | | |
|---|---|---|
| 2,081,517 | Hoffen | May 25, 1937 |
| 2,175,099 | Abbott | Oct. 3, 1939 |
| 2,377,153 | Hunter et al. | May 29, 1945 |
| 2,913,515 | Ebel et al. | Nov. 17, 1959 |

OTHER REFERENCES

"Alathon," Du Pont Information Bulletin No. X-70, 1956, 15 pages total, pages 10–13 relied upon.

"What's With Polypropylene?" Modern Plastics, vol. 35, No. 7, March 1958, pages 89–92.